(12) United States Patent
Lee

(10) Patent No.: US 11,509,815 B2
(45) Date of Patent: Nov. 22, 2022

(54) ELECTRONIC DEVICE AND METHOD FOR PROCESSING IMAGE HAVING HUMAN OBJECT AND PROVIDING INDICATOR INDICATING A RATIO FOR THE HUMAN OBJECT

(71) Applicant: Samsung Electronics Co., Ltd., Gyeonggi-do (KR)

(72) Inventor: Seonho Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 16/766,098

(22) PCT Filed: Jan. 11, 2019

(86) PCT No.: PCT/KR2019/000455
§ 371 (c)(1),
(2) Date: May 21, 2020

(87) PCT Pub. No.: WO2019/139404
PCT Pub. Date: Jul. 18, 2019

(65) Prior Publication Data
US 2021/0368093 A1 Nov. 25, 2021

(30) Foreign Application Priority Data

Jan. 11, 2018 (KR) .......................... 10-2018-0004057

(51) Int. Cl.
*H04N 5/228* (2006.01)
*H04N 5/232* (2006.01)
(Continued)

(52) U.S. Cl.
CPC ........... *H04N 5/23219* (2013.01); *G06T 7/70* (2017.01); *G06V 20/62* (2022.01); *G06V 40/10* (2022.01);
(Continued)

(58) Field of Classification Search
CPC ......... H04N 5/23219; H04N 5/232935; H04N 5/232941; G06T 7/70; G06K 9/00362; G06K 9/325
(Continued)

(56) References Cited

U.S. PATENT DOCUMENTS 9,344,673 B1 * 5/2016 Buchheit ................ G06F 3/0484
2004/0245334 A1 * 12/2004 Sikorski .................. G06F 3/147
235/383
(Continued)

FOREIGN PATENT DOCUMENTS

JP 2009-88986 A 4/2009
JP 2013-251813 A 12/2013
(Continued)

*Primary Examiner* — Usman A Khan
(74) *Attorney, Agent, or Firm* — Cha & Reiter, LLC

(57) ABSTRACT

An electronic device according to various embodiments of the present invention comprises: a camera module including a lens positioned on one side of an electronic device; a display positioned on the other side of the electronic device; and a processor electrically coupled to the camera module and the display, wherein the processor is configured to acquire a preview image through the camera module, determine whether a human object corresponding to a person is included in the preview image, determine an imaging mode of the electronic device based at least on the type and change of at least one object included in the determination and the preview image, and display, through the display, at least one indicator associated with the determined photographing mode. Various other embodiments are possible.

14 Claims, 10 Drawing Sheets

(51) Int. Cl.
    *G06T 7/70*       (2017.01)
    *G06V 20/62*     (2022.01)
    *G06V 40/10*     (2022.01)

(52) U.S. Cl.
    CPC . *H04N 5/232935* (2018.08); *H04N 5/232941* (2018.08); *G06T 2207/30196* (2013.01); *G06T 2207/30244* (2013.01)

(58) Field of Classification Search
    USPC .................................................. 348/222.1
    See application file for complete search history.

(56) References Cited

U.S. PATENT DOCUMENTS

| | | | | |
|---|---|---|---|---|
| 2005/0276446 | A1* | 12/2005 | Chen | G06V 20/52 382/173 |
| 2012/0200761 | A1* | 8/2012 | Lim | H04N 5/23218 348/E5.024 |
| 2014/0300779 | A1* | 10/2014 | Yeo | H04N 5/232935 348/234 |
| 2014/0354793 | A1 | 12/2014 | Solheim et al. | |
| 2015/0077323 | A1* | 3/2015 | Ramaswamy | G06F 3/012 345/156 |
| 2017/0026582 | A1* | 1/2017 | Kim | G06F 3/0416 |
| 2017/0128800 | A1 | 5/2017 | Solheim et al. | |

FOREIGN PATENT DOCUMENTS

| | | |
|---|---|---|
| JP | 2014-236304 A | 12/2014 |
| KR | 10-2014-0122344 A | 10/2014 |
| KR | 10-2015-0108570 A | 9/2015 |
| KR | 10-1633342 B1 | 6/2016 |
| KR | 10-1794350 B1 | 12/2017 |

\* cited by examiner

ELECTRONIC DEVICE AND METHOD FOR PROCESSING IMAGE HAVING HUMAN OBJECT AND PROVIDING INDICATOR INDICATING A RATIO FOR THE HUMAN OBJECT

CROSS REFERENCE TO RELATED APPLICATIONS

This application is a National Phase Entry of PCT International Application No. PCT/KR2019/000455, which was filed on Jan. 11, 2019, and claims a priority to Korean Patent Application No. 10-2018-0004057, which was filed on Jan. 11, 2018, the contents of which are incorporated herein by reference.

TECHNICAL FIELD

Various embodiments of the disclosure relate to an electronic device and an image processing method thereof.

BACKGROUND ART

With the recent development of technology, electronic devices provide various functions related to a camera to users by including the camera. For example, the electronic device may display a preview image acquired using the camera through a display, and may acquire an image displayed through the display when a photographing function button (e.g., a shutter) is selected by the user.

DETAILED DESCRIPTION OF INVENTION

Technical Problem

When a photographer photographs himself/herself, a method of taking a picture of the photographer himself/herself (hereinafter, referred to as "mirror selfie photographing"), which is generated in a tool that generates an image of an object using reflection of light such as a mirror, is frequently used.

When the photographer wants to acquire an image including his/her whole body or half body to perform mirror selfie photographing, or when the photographer performs mirror selfie photographing while checking a preview image displayed on a display, a somewhat unnatural image where the photographer's gaze is toward the display may be acquired or an image in which a portion of the user's face is obscured by an electronic device may be acquired. In addition, when the photographer wants to acquire an image in which the photographer's gaze faces the front through mirror selfie photographing, the photographer must stare at the display on which the preview image is displayed and the front alternately, and it is difficult for the photographer to check the preview image according to the position of the display.

When the photographer takes a picture of his/her whole body or half body reflected in a mirror, the body proportion of the photographer included in an image varies greatly depending on the height and/or photographing angle of the camera. If the photographer shoots while viewing the front without staring at the display, it may be difficult for the photographer to check an image obtained through the photographing at the time of photographing.

According to various embodiments of the disclosure, an electronic device may determine whether to perform mirror selfie photographing at least based on the type and change of at least one object included in a preview image, and may provide a user with various UIs related to mirror selfie photographing.

Solution to Problem

An electronic device according to various embodiments of the disclosure may include: a camera module configured to include a lens positioned on one surface of the electronic device; a display configured to be positioned on the other surface of the electronic device; and a processor configured to be electrically connected to the camera module and the display, wherein the processor is configured to acquire a preview image through the camera module, to determine whether a human object corresponding to a person is included in the preview image, to determine a photographing mode of the electronic device at least based on the determination and a type and change of at least one object included in the preview image, and to display at least one indicator related to the determined photographing mode through the display.

An image processing method of an electronic device according to various embodiments of the disclosure may include: acquiring a preview image through a camera module including a lens positioned on one surface of the electronic device; determining whether a human object corresponding to a person is included in the preview image; determining a photographing mode of the electronic device at least based on the determination and a type and change of at least one object included in the preview image; and displaying at least one indicator related to the determined photographing mode through a display positioned on the other surface of the electronic device.

Advantageous Effects of Invention

According to various embodiments of the disclosure, it is possible to determine whether to perform mirror selfie photographing and to provide a user with various UIs related to the mirror selfie photographing.

According to various embodiments of the disclosure, it is possible to provide a function of automatically correcting a portion of a body region of a photographer included in an image based on the body proportion of the photographer included in the image.

MODE FOR THE INVENTION

Figure 1:
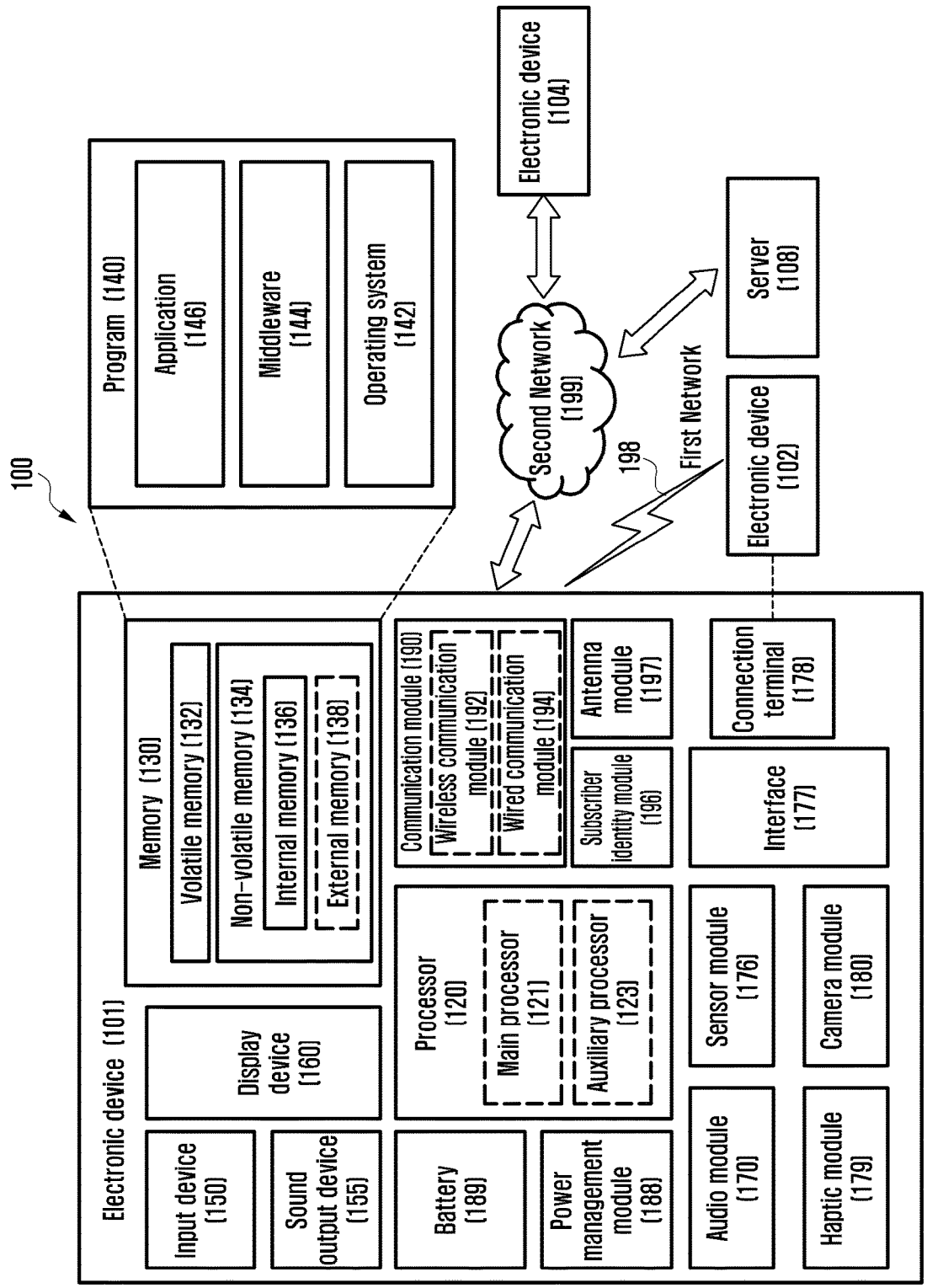
FIG. 1 is a block diagram illustrating an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
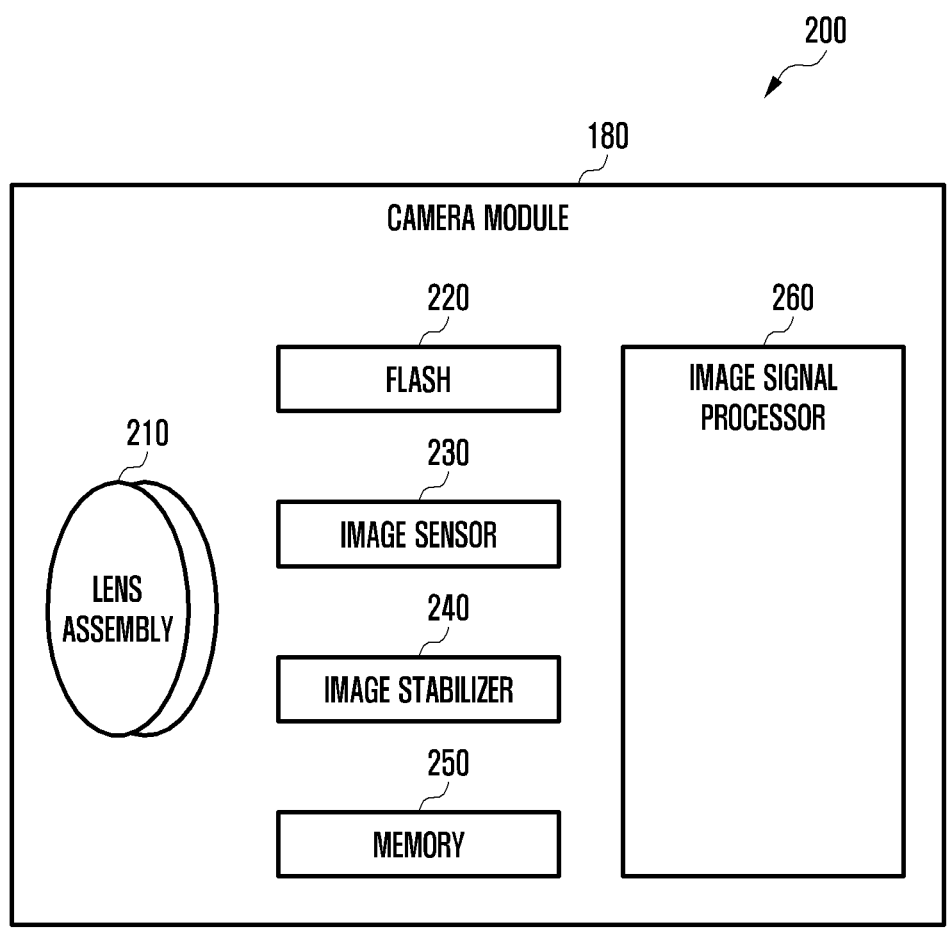
FIG. 2 is a block diagram illustrating a camera module according to various embodiments of the disclosure.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device 101 according to various embodiments of the disclosure may include a camera module (e.g., the camera module 180 of FIG. 1) configured to include a lens (e.g., the lens assembly 210 of FIG. 2) positioned on one surface of the electronic device 101; a display (e.g., the display device 160 of FIG. 1) configured to be positioned on the other surface of the electronic device 101; and a processor (e.g., the processor 120 of FIG. 1) configured to be electrically connected to the camera module and the display. The processor may be configured to acquire a preview image through the camera module, to determine whether the preview image includes a human object corresponding to a person, to determine a photographing mode of the electronic device 101 at least based on the determination and a type and change of at least one object included in the preview image, and to display at least one indicator related to the determined photographing mode through a display.

The processor (e.g., the processor 120 of FIG. 1) of electronic device 101 according to various embodiments of the disclosure may be configured to invert the preview image vertically or horizontally when the human object is included in the preview image and to determine the photographing mode at least based on whether text is included in the inverted preview image.

The processor (e.g., the processor 120 of FIG. 1) of the electronic device 101 according to various embodiments of the disclosure may be configured to determine whether the preview image includes an object corresponding to the electronic device 101 when the human object is included in the preview image, and to determine the photographing mode at least based on a change in positions of the remaining objects except the object corresponding to the electronic device 101 included in the preview image with respect to the position of the object corresponding to the electronic device 101 when the object corresponding to the electronic device 101 is included in the preview image.

The processor (e.g., the processor 120 of FIG. 1) of the electronic device 101 according to various embodiments of the disclosure may be configured to determine a specific region of the preview image in which the human object is located when the human object is included in the preview image, and to determine the photographing mode at least based on a difference between a change in at least one object included in the specific region and a change in at least one object included in the remaining region except the specific region.

The electronic device 101 according to various embodiments of the disclosure may include a sensor module (e.g., the sensor module 176 of FIG. 1). The processor (e.g., the processor 120 of FIG. 1) of the electronic device 101 may be configured to determine whether the preview image includes the object corresponding to the electronic device 101 when the human object is included in the preview image, and to detect a physical movement of the electronic device 101 through the sensor module when the object corresponding to the electronic device 101 is included in the preview image, and to determine the photographing mode based on a result obtained by comparing a positional change in the preview image of the object corresponding to the electronic device 101 with respect to the human object with the detected physical movement of the electronic device 101.

The electronic device 101 according to various embodiments of the disclosure may include at least one light emitting diode (e.g., the flash 220 of FIG. 2) positioned on one surface of the electronic device 101. The processor (e.g., the processor 120 of FIG. 1) of the electronic device 101 may be configured to control the at least one light emitting diode to emit light according to a configured reference when the human object is included in the preview image, and to determine the photographing mode at least based on whether an object corresponding to the light emitted according to the configured reference is included in the preview image.

The processor (e.g., the processor 120 of FIG. 1) of the electronic device 101 according to various embodiments of the disclosure may be configured to identify a face region of the human object included in the preview image, and to display an indicator corresponding to the human object through the display (e.g., the display device 160 of FIG. 1) based on a size of the identified face region.

The processor (e.g., the processor 120 of FIG. 1) of the electronic device 101 according to various embodiments of the disclosure may be configured to determine a ratio for the human object based on the size of the identified face region and a size of the human object, and to display an indicator indicating the determined ratio for the human object through the display (e.g., the display device 160 of FIG. 1).

The processor (e.g., the processor 120 of FIG. 1) of the electronic device 101 according to various embodiments of the disclosure may be configured to change a color of the indicator indicating the ratio for the human object according to a change in the ratio for the human object.

The processor (e.g., the processor 120 of FIG. 1) of the electronic device 101 according to various embodiments of the disclosure may be configured to acquire an image through a camera module (e.g., the camera module 180 of FIG. 1) in response to a signal related to photographing and to adjust a size of at least one region related to a human object included in the image based on a ratio for a determined human object.

Figure 3:
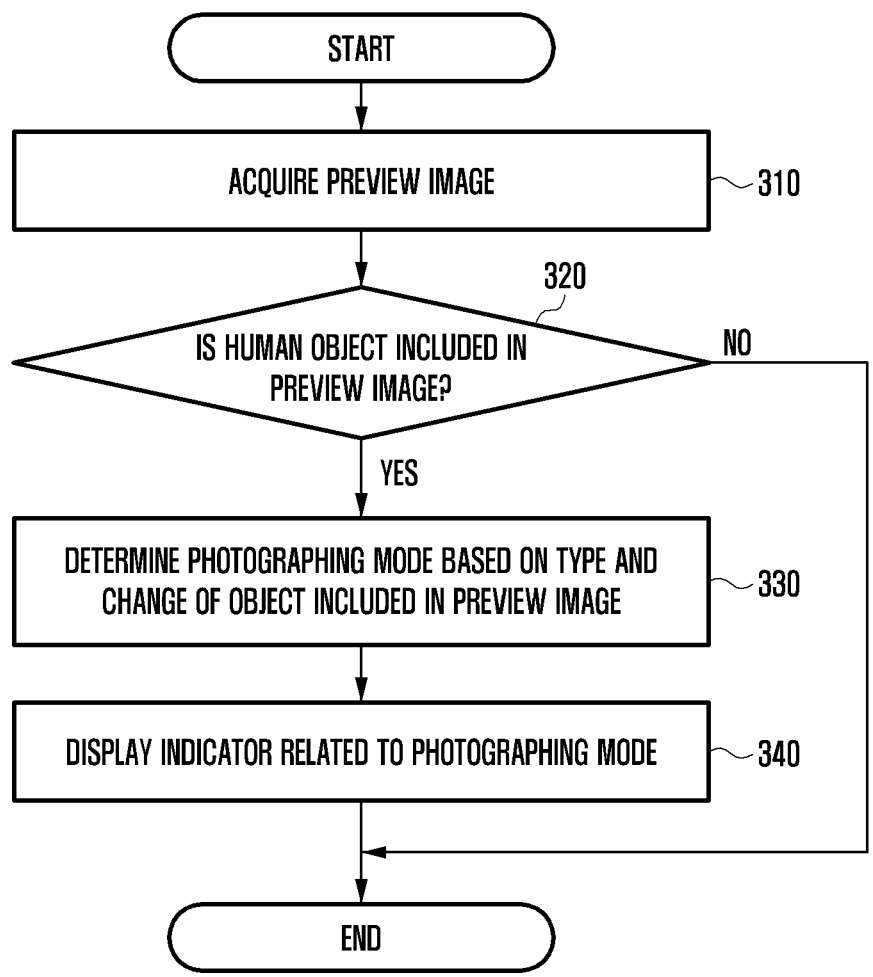
FIG. 3 is a flowchart illustrating an image processing method of an electronic device according to various embodiments of the disclosure.

FIG. 3 is a flowchart illustrating an image processing method of the electronic device 101 according to various embodiments of the disclosure.

According to various embodiments, in operation 310, a processor (the processor 120 of FIG. 1 or an image signal processor 260 of FIG. 2) may acquire a preview image through the camera module 180. The processor may acquire the preview image by acquiring the preview images through a rear camera capable of acquiring an image through the lens assembly 210 positioned on a different surface from a surface of the electronic device 101 on which, for example, the display device 160 is positioned. The preview image may refer to an image obtained by the processor using light received through the lens assembly 210 of the camera module 180 before whether to shoot a subject is determined after, for example, the camera module 180 is driven. The processor may display, for example, the obtained preview image through the display device 160.

According to various embodiments, in operation 320, the processor may determine whether a human object which is an object corresponding to a person is included in the preview image. For example, the processor may determine whether the object corresponding to the person is included in the preview image based on a type of the object included in the preview image. For example, the processor may determine whether the object corresponding to the person is included in the preview image based on a variety of information such as color, brightness, saturation, lengths of a straight line component and a curved line component of a boundary, or a bending angle of the object included in the preview image.

According to various embodiments, in operation 330, the processor may determine a photographing mode which is an operation mode related to photographing of the electronic device 101 at least based on a type and change of at least one object included in the preview image when the object corresponding to the person is included in the preview image. The processor may determine any one of, for example, a normal photographing mode and a mirror selfie photographing mode to be the photographing mode of the electronic device 101. For example, the mirror selfie photographing mode may refer to a photographing mode related to taking a picture of a photographer which is generated in a tool that generates an image of an object using reflection of light such as a mirror, and the normal photographing mode may refer to the remaining photographing modes of the electronic device 101 except the mirror selfie photographing mode.

According to various embodiments, the processor may determine, for example, the type (e.g., person, TV, smart phone, or camera) of the object included in the preview image. For example, the processor may determine the type of the object based on the shape of the object included in the preview image. The processor may determine the type of, for example, the object based on a variety of information such as color, brightness, saturation, lengths of a straight line component and a curved line component of a boundary, or a bending angle of the object included in the preview image.

According to various embodiments, the processor may identify a change in the at least one object included in the preview image. For example, the processor may detect various changes such as the movement of the object included in the preview image, the positional change thereof, the number of objects, and the like. The processor may detect the change in the at least one object included in the preview image by comparing, for example, the preview images obtained through the camera module 180. For example, the processor may compare at least one object included in a first preview image with at least one object included in a second preview image obtained before the first preview image is obtained, and may identify the movement of the object included in the preview image, the positional change thereof, or the number of objects based on a comparison result.

According to various embodiments, the processor may determine whether text is included in the preview image. For example, when an object corresponding to a person is included in the preview image, the processor may invert the preview image horizontally or vertically, and may determine the photographing mode of the electronic device 101 at least based on whether the text is included in the inverted preview image. For example, when the text is included in the inverted preview image, the processor may determine the photographing mode to be the mirror selfie photographing mode, and when the text is not included in the inverted preview image, the processor may determine the photographing mode to be the normal photographing mode. The processor may use, for example, an optical character recognition (OCR) technique to determine whether the text is included in the preview image.

According to various embodiments, the processor may determine the photographing mode of the electronic device 101 based on a result obtained by comparing a positional change in the preview image of the object corresponding to the electronic device 101 based on the object corresponding to the person included in the preview image with a physical movement of the electronic device 101. For example, when the object corresponding to the person and the object corresponding to the electronic device 101 are included in the preview image, the processor may detect the physical movement of the electronic device 101 through the sensor module 176. For example, the movement of the electronic device 101 in a left horizontal direction is detected through the sensor module 176 and it is determined that the object corresponding to the electronic device 101 is moved away from the object corresponding to the person in the preview image in the left horizontal direction, the processor may determine the photographing mode to be the mirror selfie photographing mode.

According to various embodiments, the processor may determine the photographing mode of the electronic device 101 based on positional changes of the remaining objects included in the preview image based on the position of the object corresponding to the electronic device 101 included in the preview image. For example, when the positions of the remaining objects included in the preview image except the object corresponding to the electronic device 101 is moved, the processor may determine the photographing mode to be the mirror selfie photographing mode.

According to various embodiments, the processor may determine a specific region of the preview image in which the object corresponding to the person is located, and may determine the photographing mode of the electronic device 101 based on a difference between a change in at least one object included in the specific region of the preview image and a change in at least one object included in the remaining regions except the specific region of the preview image. For example, when the position within the specific region of the at least one object included in the specific region of the preview image is not changed and the position of the at least one object included in the remaining regions except the specific region of the preview image is moved, the processor may determine the photographing mode to be the mirror selfie photographing mode.

According to various embodiments, the processor may emit light through one or more light emitting diodes included in the flash 220 according to a configured reference, and may determine the photographing mode based on whether an object corresponding to the light emitted according to the configured reference is included in the preview image. For example, the processor may control the light to blink through the flash 220 according to a configured cycle, and may determine the photographing mode of the electronic device 101 to be the mirror selfie photographing mode when the light blinking according to the configured cycle is detected from the preview image.

According to various embodiments, in operation 340, the processor may display an indicator related to the photographing mode of the electronic device 101. For example, when the photographing mode is the mirror selfie photographing mode, the processor may display an indicator indicating a face region of the object corresponding to the person included in the preview image together with the preview image. For example, the processor may display a circular indicator surrounding the face region of the object corresponding to the person.

According to an embodiment, when the photographing mode is the mirror selfie photographing mode, the processor may display an indicator indicating a body proportion of the object corresponding to the person included in the preview image. The body radio of the object corresponding to the person may refer to, for example, a ratio of a vertical length of the face region of the object corresponding to the person to the entire vertical length of the object corresponding to the person including the face region. For example, when the ratio of the vertical length of the face region of the object corresponding to the person to the entire vertical length is 1:6, the processor may determine a body proportion of the object corresponding to the person to be six heads.

According to an embodiment, when the photographing mode is the mirror selfie photographing mode, the processor may determine whether the body proportion of the object corresponding to the person included in the preview image corresponds to a configured body portion, and may determine a color of an indicator indicating the body proportion based on a determination result. For example, when the body proportion of the object corresponding to the person included in the preview image corresponds to the configured body proportion, the processor may display, for example, the edge or the whole of the indicator indicating the body proportion in green. For example, when the body proportion of the object corresponding to the person included in the preview image does not correspond to the configured body proportion, the processor may display the edge or the whole of the indicator indicating the body proportion in red.

According to an embodiment, the processor may change the color of the indicator indicating the body proportion according to a difference between the body proportion of the object corresponding to the person included in the preview image and the configured body proportion. For example, in a case in which the configured body proportion is seven heads, the processor may display the edge or the whole of the indicator indicating the body proportion in red when the body proportion of the object corresponding to the person included in the preview image is five heads, may display the same in yellow when the body proportion is six heads, may display the same in green when the body proportion is seven heads, may display the same in yellow when the body proportion is eight heads, or may display the same in red when the body proportion is nine heads.

According to an embodiment, when the photographing mode is the mirror selfie photographing mode, the processor may display an indicator dividing the body regions of the object corresponding to the person included in the preview image. For example, the processor may display an indicator for dividing the object corresponding to the person into a plurality of partial regions (e.g., a face region, an upper body region excluding the face region, a leg region, a foot region, etc.). The processor may divide, for example, the object corresponding to the person into a plurality of regions based on a variety of information such as color, brightness, saturation, lengths of a straight line component and a curved line component of a boundary, or a bending angle of each partial region included in the object corresponding to the person in order to divide the object corresponding to the person into the plurality of regions.

According to an embodiment, the processor may display an indicator providing guide information so that the body proportion of the object corresponding to the person included in the preview image matches the configured body proportion. For example, when the body proportion of the object corresponding to the person included in the preview image is six heads and the configured body proportion is five heads, the electronic device 101 may display an indicator providing guide information that can induce a user to change a photographing angle.

According to an embodiment, the processor may output the guide information that can induce a user to change a photographing angle through the audio module 170.

According to an embodiment, when the body proportion of the object corresponding to the person included in the preview image matches the configured body proportion, the processor may output a mechanical vibration through a haptic module 179.

According to an embodiment, the processor may emit light through the one or more light emitting diodes included in the flash 220 based on whether the body proportion of the object corresponding to the person included in the preview image matches the configured body proportion. For example, when the body proportion of the object corresponding to the person included in the preview image does not match the configured body proportion, the processor may emit light through the one or more light emitting diodes included in the flash 220. For example, when the body proportion of the object corresponding to the person included in the preview image does not match the configured body proportion, the processor may blink light twice through the flash 220 during a configured period, and when the body proportion of the object corresponding to the person included in the preview image matches the configured body proportion, the processor may blink light once through the flash 220 during the configured period.

Figure 4:
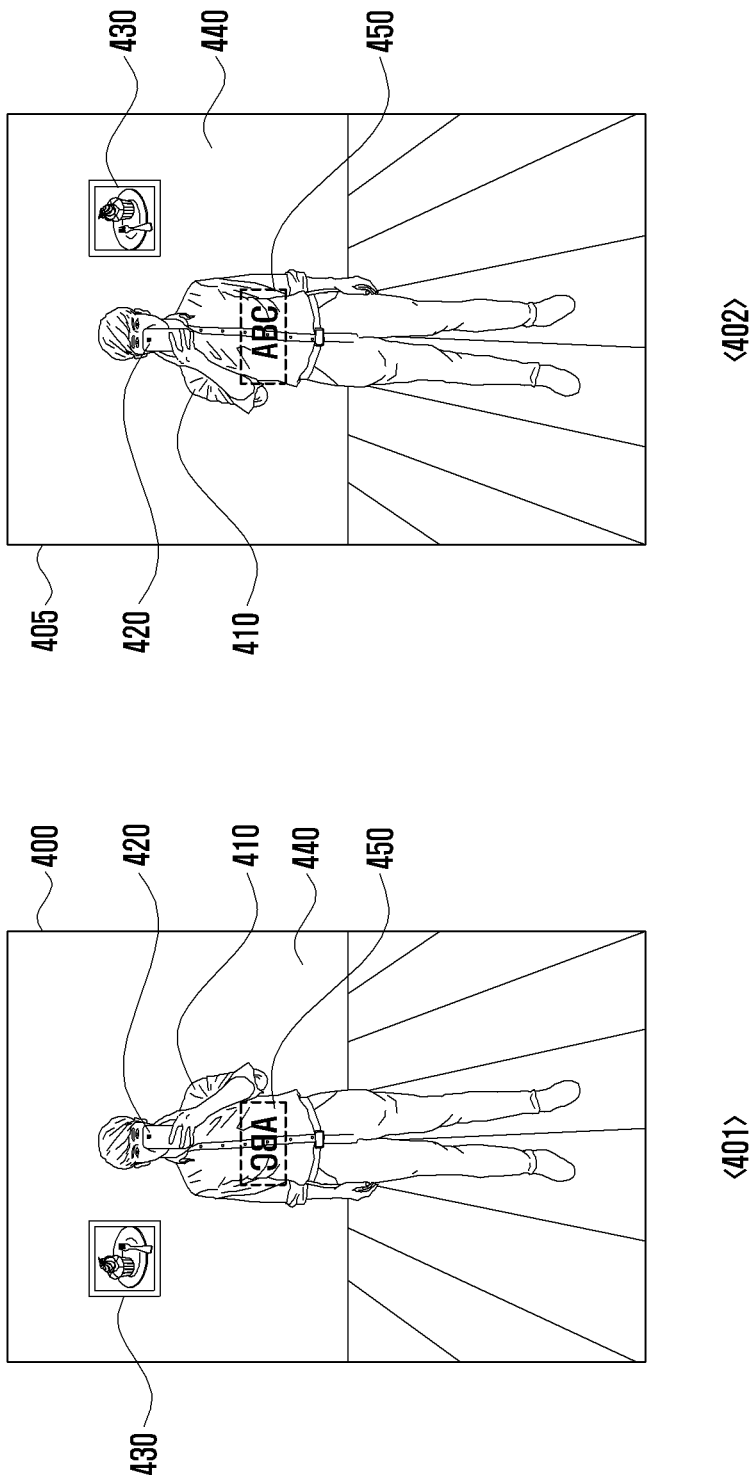
FIG. 4 is a diagram illustrating an example related to an operation of determining whether to perform mirror selfie photographing of an electronic device according to various embodiments of the disclosure.

FIG. 4 is a diagram illustrating an example related to an operation of determining whether to perform mirror selfie photographing of the electronic device 101 according to various embodiments of the disclosure.

Referring to reference numeral 401 of FIG. 4, the electronic device 101 according to various embodiments of the disclosure may display a preview image 400 through the display device 160. The electronic device 101 may determine a type of, for example, an object included in the preview image 400. For example, the electronic device 101 may identify that an object 410 corresponding to a person, an object 420 corresponding to the electronic device 101, an object 430 corresponding to a thing such as a picture frame, and an object 440 corresponding to a background are included in the preview image 400.

According to an embodiment, the electronic device 101 may determine whether the preview image 400 includes text. Since, for example, the text 450 included in the preview image 400 is inverted horizontally, the electronic device 101 may determine that the preview image 400 does not include the text. Since, for example, the object 410 corresponding to the person is included in the preview image 400, the electronic device 101 may invert the preview image 400 horizontally or vertically.

Referring to reference numeral 402 of FIG. 4, the electronic device 101 according to various embodiments of the disclosure may determine, for example, whether the text is included in the horizontally inverted preview image 405. The electronic device 101 may determine whether the text is included in the horizontally inverted preview image 405 in a state in which the preview view image 400 is displayed without displaying the inverted preview image 405 through the display device 106. The electronic device 101 may identify that the text 450 is included in, for example, the horizontally inverted preview image 405, and may determine the photographing mode of the electronic device 101 to be the mirror selfie photographing mode.

Figure 5:
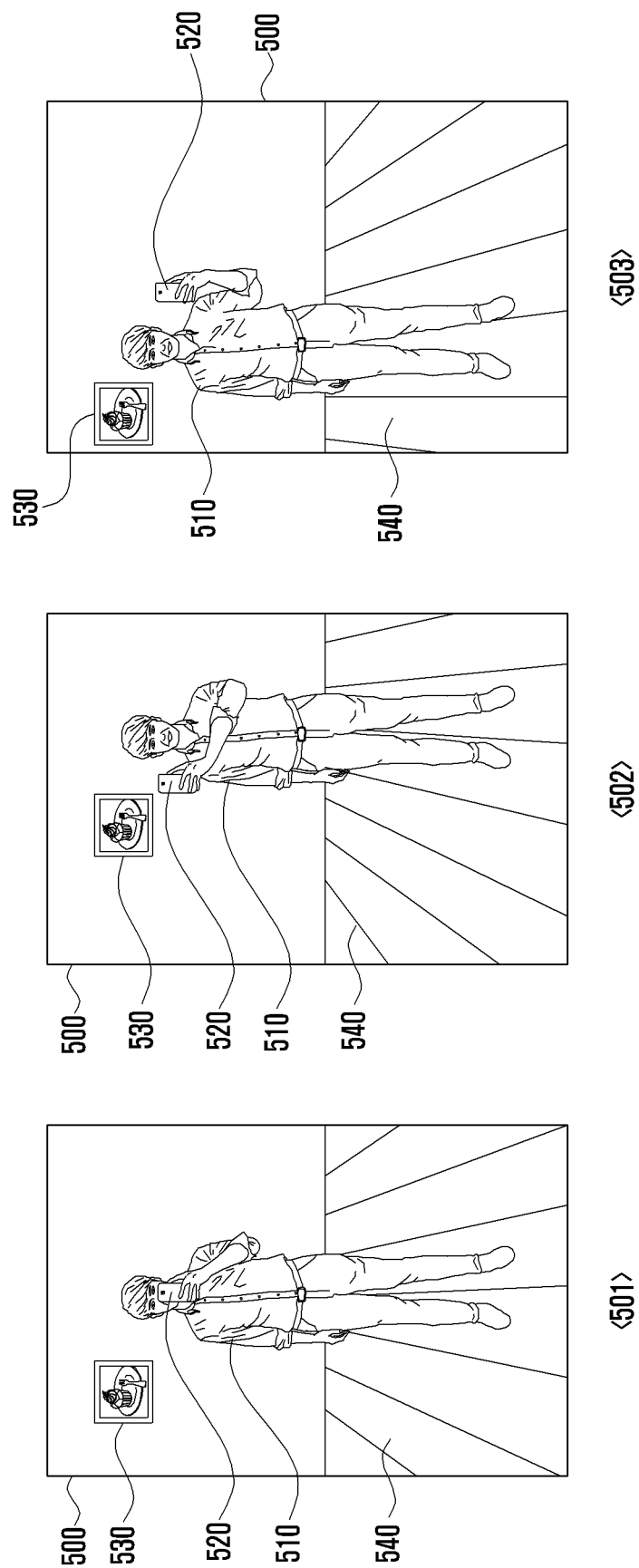
FIG. 5 is a diagram illustrating an example related to an operation of determining whether to perform mirror selfie photographing of an electronic device according to various embodiments of the disclosure.

FIG. 5 is a diagram illustrating an example related to an operation of determining whether to perform mirror selfie photographing of the electronic device 101 according to various embodiments of the disclosure.

Referring to reference numeral 501 of FIG. 5, the electronic device 101 according to various embodiments of the disclosure may display a preview image 500 through the display device 160. The electronic device 101 may determine a type of, for example, an object included in the preview image 500. For example, the electronic device 101 may identify that an object 510 corresponding to a person, an object 520 corresponding to the electronic device 101, an object 530 corresponding to a thing such as a picture frame, and an object 440 corresponding to a background are included in the preview image 400.

According to an embodiment, when the object 510 corresponding to the person and the object 520 corresponding to the electronic device 101 are included in the preview image 500, the electronic device 101 may detect a physical movement of the electronic device 101 through the sensor module 176, and may determine a photographing mode of the electronic device 101 based on a result obtained by comparing a positional change in the preview image 500 of the object 520 corresponding to the electronic device 101 with the detected physical movement of the electronic device 101 with respect to the object 510 corresponding to the person included in the preview image 500.

Referring to reference numeral 502 of FIG. 5, since the movement of the electronic device 101 in a left horizontal direction is detected through the sensor module 176 and the object 520 corresponding to the electronic device 101 is displayed to be moved away from the object 510 corresponding to the person in the preview image 500 in the left horizontal direction, the electronic device 101 may determine the photographing mode to be the mirror selfie photographing mode.

Referring to reference numeral 503 of FIG. 5, since the movement of the electronic device 101 in a right horizontal direction is detected through the sensor module 176 and the object 520 corresponding to the electronic device 101 is displayed to be moved away from the object 510 corresponding to the person in the preview image 500 in a right horizontal direction, the electronic device 101 may determine the photographing mode to be the mirror selfie photographing mode.

According to an embodiment, when the object 520 corresponding to the electronic device 101 is included in the preview image 500, the electronic device 101 may determine the photographing mode of the electronic device 101 based on positional changes of the remaining objects 510, 530, and 540 included in the preview image 500 with respect to a position of the object 510, which is displayed on a screen, corresponding to the electronic device 101 included in the preview image 500.

For example, referring to reference numerals 501 and 502 of FIG. 5, since the position of the object 510, which is displayed on the screen, corresponding to the electronic device 101 included in the preview image 500 is not changed and positions of the remaining objects 510, 530, and 540, which are displayed on the screen, included in the preview image 500 are all displayed to be moved in the right horizontal direction, the electronic device 101 may determine the photographing mode to be the mirror selfie photographing mode.

Figure 6:
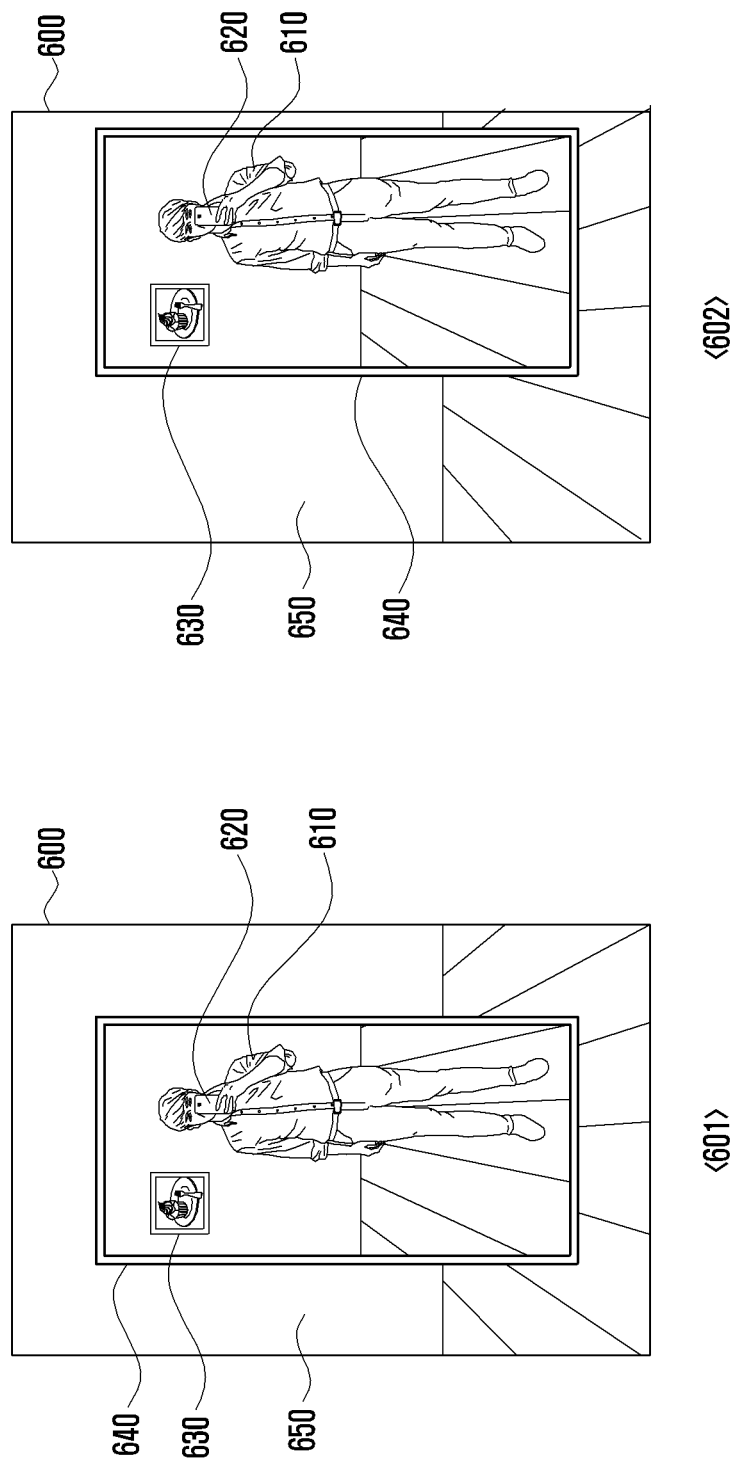
FIG. 6 is a diagram illustrating an example related to an operation of determining whether to perform mirror selfie photographing of an electronic device according to various embodiments of the disclosure.

FIG. 6 is a diagram illustrating an example related to an operation of determining whether to perform mirror selfie photographing of an electronic device according to various embodiments of the disclosure.

Referring to reference numeral 601 of FIG. 6, the electronic device 101 according to various embodiments of the disclosure may display a preview image 600 through the display device 160. According to an embodiment, the electronic device 101 may determine a type of an object included in the preview image 600. For example, the electronic device 101 may identify that an object 610 corresponding to a person, an object 620 corresponding to the electronic device 101, objects 630 and 640 corresponding to other objects, and an object 650 corresponding to a background are included in the preview image 600.

According to an embodiment, the electronic device 101 may identify that the object 610 corresponding to the person is included in a region related to the object 640 corresponding to the other objects (e.g., mirror) of the preview image 600.

Referring to reference numeral 602 of FIG. 6, when comparing the preview image 600 of reference numeral 601 with the preview image 600 of reference numeral 602, since the positions of the objects 610, 620, and 630 within the region, which are included in the region related to the object 640 corresponding to the other objects (e.g., mirror) are not changed and the position of the remaining object 640 in the preview image 600 except the objects 610, 620, and 630 included in the region is displayed to be moved in the right horizontal direction, the electronic device 101 may determine the photographing mode to be the mirror selfie photographing mode.

Figure 7:
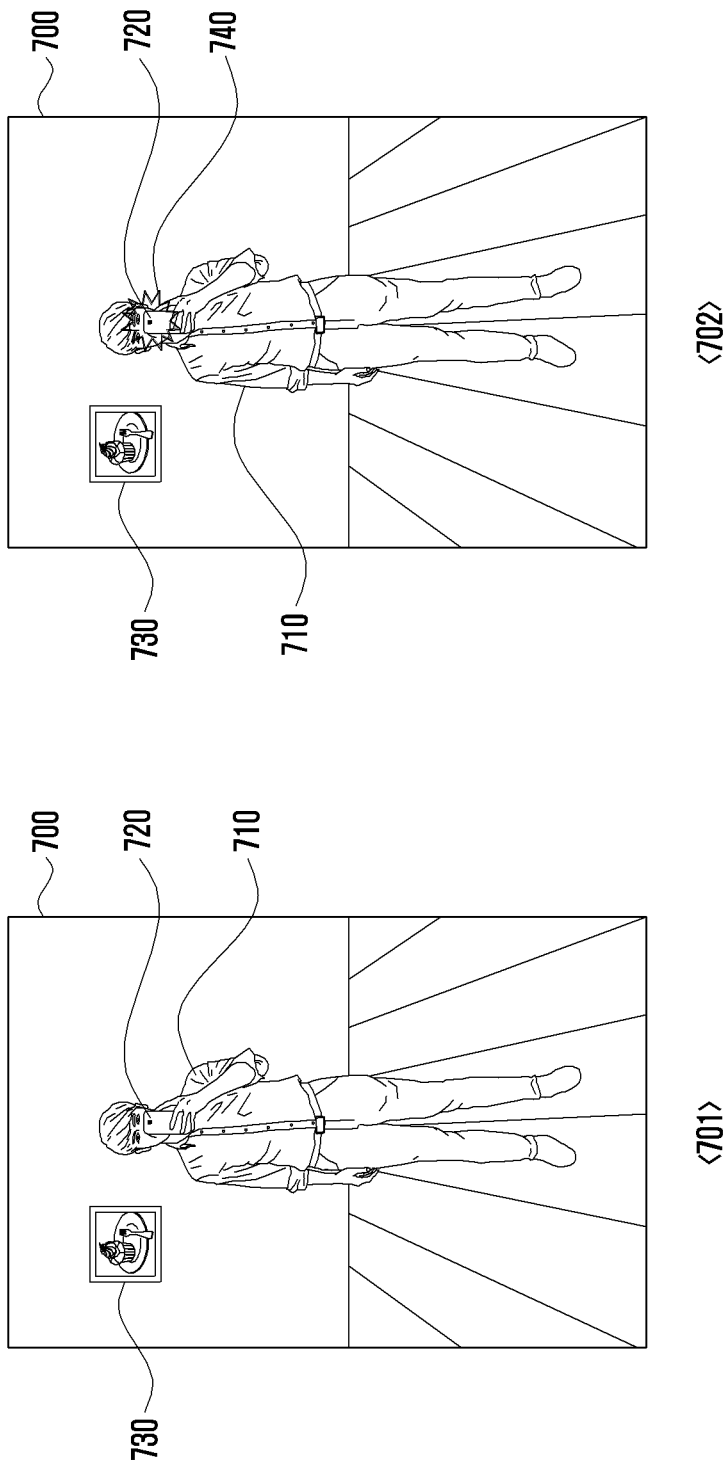
FIG. 7 is a diagram illustrating an example related to an operation of determining whether to perform mirror selfie photographing of an electronic device according to various embodiments of the disclosure.

FIG. 7 is a diagram illustrating an example related to an operation of determining whether to perform mirror selfie photographing of the electronic device 101 according to various embodiments of the disclosure.

Referring to reference numeral 701 of FIG. 7, the electronic device 101 according to various embodiments of the disclosure may display a preview image 700 through the display device 160. The electronic device 101 may determine a type of, for example, an object included in the preview image 700. For example, the electronic device 101 may identify that an object 710 corresponding to a person, an object 720 corresponding to the electronic device 101, an object 730 corresponding to a thing such as a picture frame, and an object 740 corresponding to a background are included in the preview image 700.

According to an embodiment, when the object 710 corresponding to the person and the object 720 corresponding to the electronic device 101 are included in the preview image 700, the electronic device 101 may emit light through one or more light emitting diodes included in the flash 220 according to a configured reference.

Referring to reference numeral 702 of FIG. 7, the electronic device 101 may control light to blink according to a configured period through the flash 220, and determine the photographing mode of the electronic device 101 to be the mirror selfie photographing mode when light 750 blinking according to the configured period is detected from the preview image 700.

Figure 8A:
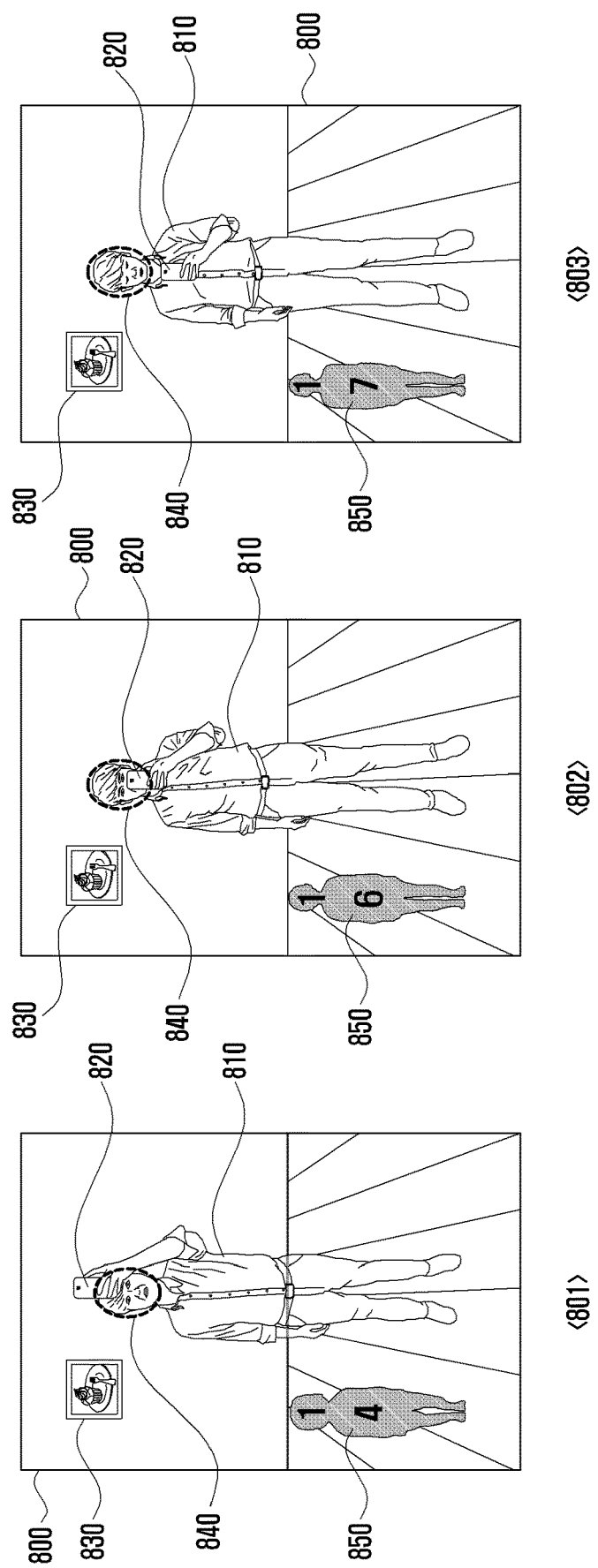
FIGS. 8A and 8B are diagrams illustrating an example of a UI related to mirror selfie photographing displayed with a preview image according to various embodiments of the disclosure.

FIG. 8A are diagrams illustrating an example of a UI related to mirror selfie photographing displayed with a preview image 800 according to various embodiments of the disclosure.

The electronic device 101 according to various embodiments of the disclosure may display the preview image 800 through the display device 160. The electronic device 101 may determine a type of, for example, an object included in the preview image 800. For example, the electronic device 101 may identify that an object 810 corresponding to a person, an object 820 corresponding to the electronic device 101, and an object 830 corresponding to a thing such as a picture frame are included in the preview image 800. When the photographing mode is the mirror selfie photographing mode, the electronic device 101 may display an indicator related to the mirror selfie photographing mode.

Referring to reference numeral 801 of FIG. 8, when the photographing mode is the mirror selfie photographing mode, the electronic device 101 may display an indicator 840 indicating a face region of the object 810 corresponding to the person included in the preview image 800 together with the preview image 800.

According to an embodiment, the electronic device 101 may display an indicator 850 indicating a body proportion of the object 810 corresponding to the person included in the preview image 800. For example, the electronic device 101 may identify that a ratio of a vertical length of the face region of the object 810 corresponding to the person to the entire vertical length of the person is 1:5, and may display the indicator 850 indicating the body proportion of the object 810 corresponding to the person.

Referring to reference numeral 802 of FIG. 8A, the electronic device 101 may identify that the vertical length of the face region of the object 810 corresponding to the person to the entire vertical length of the person is 1:7, and may display the indicator 850 indicating the body proportion of the object 810 corresponding to the person.

Referring to reference numeral 803 of FIG. 8A, the electronic device 101 may identify that the ratio of the vertical length of the face region of the object 810 corresponding to the person to the entire vertical length of the person is 1:8, and may display the indicator 850 indicating the body proportion of the object 810 corresponding to the person.

According to an embodiment, the electronic device 101 may determine whether the body proportion of the object 810 corresponding to the person included in the preview image 800 corresponds to a configured body proportion, and may display a color of the indicator 850 indicating the body proportion displayed together with the preview image 800 according to a determination result.

Figure 8B:
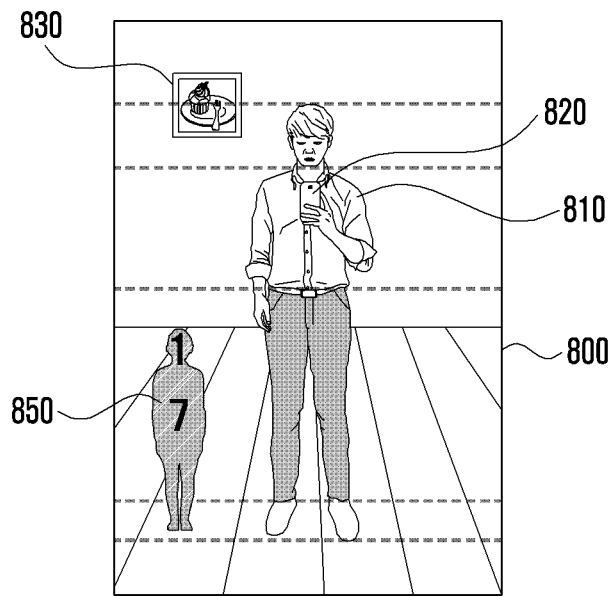

Referring to FIG. 8B, the electronic device 101 may display an indicator dividing body regions of the object 810 corresponding to the person included in the preview image 800. For example, the electronic device 101 may display a dotted line-indicator dividing the object corresponding to the person into a face region, an upper body region except the face region, a leg region, and a foot region. The electronic device 101 may divide the object 810 corresponding to the person into a plurality of regions based on a variety of information such as color, brightness, saturation, lengths of a straight line component and a curved line component of a boundary, or a bending angle of, for example, the object 810 corresponding to the person in order to divide the object 801 corresponding to the person into the plurality of regions.

Figure 9:
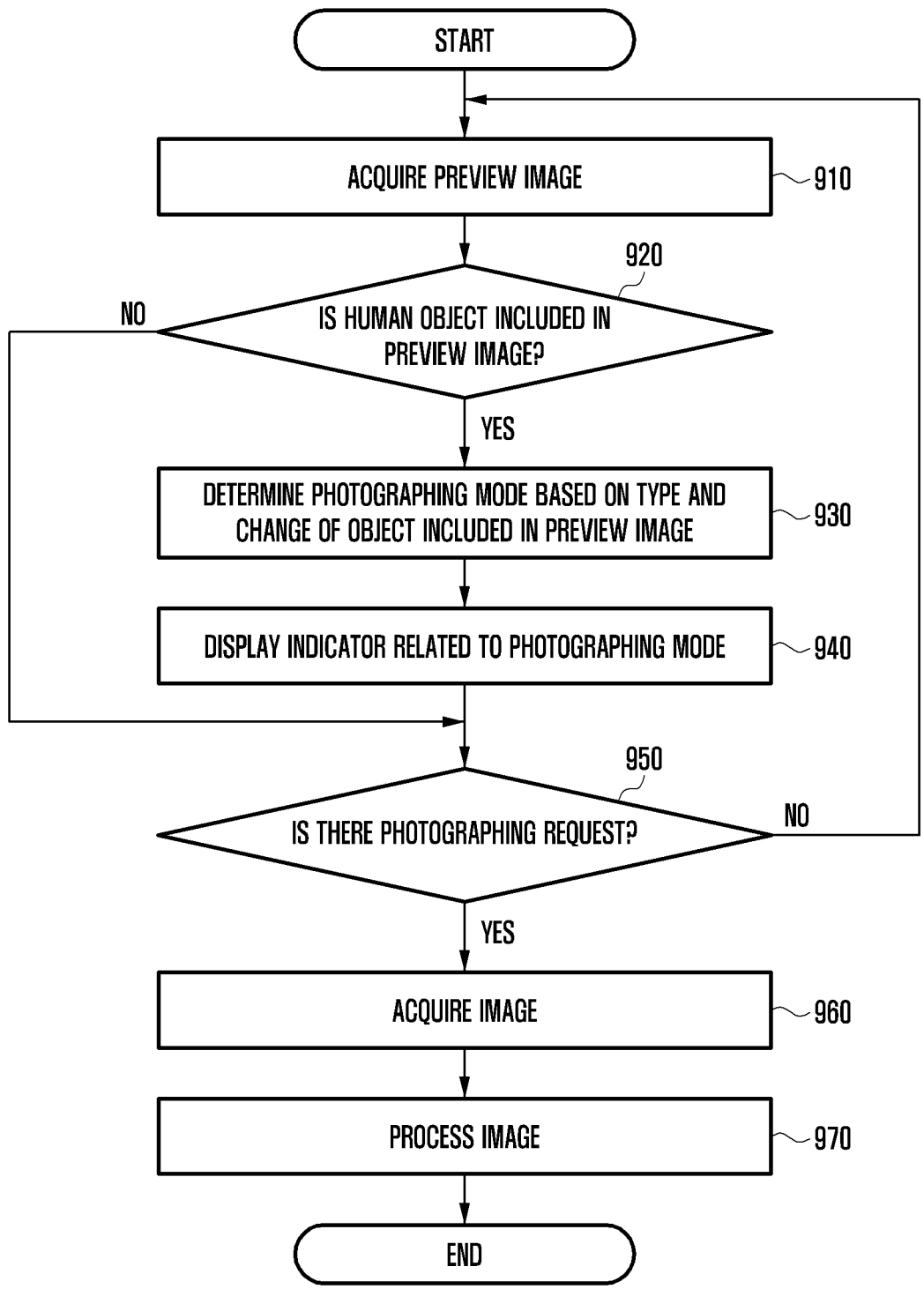
FIG. 9 is a flowchart illustrating an image processing method of an electronic device according to various embodiments of the disclosure.

FIG. 9 is a flowchart illustrating an image processing method of the electronic device 101 according to various embodiments of the disclosure. Details overlapping with those described in FIG. 3 will be omitted.

According to various embodiments, in operation 910, a processor (e.g., the processor 120 of FIG. 1 or the image signal processor 260 of FIG. 2) may acquire a preview image through the camera module 180. For example, the processor may acquire the preview image through a rear camera positioned on a different surface from a surface of the electronic device 101 on which the display device 160 is located. The processor may display the acquired preview image through, for example, the display device 160.

According to various embodiments, in operation 920, the processor may determine whether a human object which is an object corresponding to a person is included in the preview image. For example, the processor may determine whether the object corresponding to the person is included in the preview image based on the type of the object included in the preview image. For example, the processor may determine whether the object corresponding to the person is included in the preview image based on a variety of information such as color, brightness, saturation, lengths of a straight line component and a curved line component of a boundary, or a bending angle of the object included in the preview image.

According to various embodiments, in operation 930, when the object corresponding to the person is included in the preview image, the processor may determine a photographing mode which is an operation mode related to photographing of the electronic device 101 at least based on a type and change of at least one object included in the preview image. The processor may determine any one of, for example, a normal photographing mode and a mirror selfie photographing mode to be the photographing mode.

According to various embodiments, the processor may determine the type (e.g., person, TV, smart phone, or camera) of the object included in the preview image. For example, the processor may determine the type of the object based on the shape of the object included in the preview image.

According to various embodiments, the processor may detect a change in the at least one object included in the preview image. For example, the processor may detect various changes such as movement of the object included in the preview image, a positional change thereof, a change in the number of objects, and the like.

According to various embodiments, the processor may determine whether text is included in the preview image. When the object corresponding to the person is included in the preview image, the processor may invert, for example, the preview image horizontally or vertically, and may determine the photographing mode of the electronic device 101 at least based on whether the text is included in the inverted preview image. For example, when the text is included in the inverted preview image, the processor may determine the photographing mode to be the mirror selfie photographing mode. When the text is not included in the inverted preview image, the processor may determine the photographing mode to be the normal photographing mode. The processor may use, for example, OCR technique to recognize the text.

According to various embodiments, when the object corresponding to the person and the object corresponding to the electronic device 101 are included in the preview image, the processor may detect a physical movement of the electronic device 101 through the sensor module 176, and may determine the photographing mode of the electronic device 101 based on a result obtained by comparing a positional change in the preview image of the object corresponding to the electronic device 101 with the detected physical movement of the electronic device 101 with respect to the object corresponding to the person included in the preview image. For example, when the movement of the electronic device 101 in a left horizontal direction is detected through the sensor module 176 and it is determined that the object corresponding to the electronic device 101 is moved away from the object corresponding to the person in the preview image in the left horizontal direction, the processor may determine the photographing mode to be the mirror selfie photographing mode.

According to various embodiments, the processor may determine the photographing mode of the electronic device 101 based on positional changes in the remaining objects included in the preview image with respect to the position of the object corresponding to the electronic device 101 included in the preview image. For example, when the positions of the remaining objects included in the preview image except the object corresponding to the electronic device 101 are moved, the processor may determine the photographing mode to be the mirror selfie photographing mode.

According to various embodiments, the processor may determine a specific region of the preview image in which the object corresponding to the person is located, and may determine the photographing mode of the electronic device 101 based on a difference between a change in at least one object included in the specific region of the preview image and a change in at least one object included in the remaining region except the specific region of the preview image. For example, when the position of the at least one object, which is included in the specific region of the preview image, within the specific region is not changed and the position of the at least one object included in the remaining region except the specific region of the preview image is moved, the processor may determine the photographing mode to be the mirror selfie photographing mode.

According to various embodiments, the processor may emit light through one or more light emitting diodes included in the flash 220 according to a configured reference, and may determine the photographing mode based on whether an object corresponding to the light emitted according to the configured reference is included in the preview image. For example, the processor may control the light to blink according to a configured period through the flash 220, and may determine the photographing mode of the electronic device 101 to be the mirror selfie photographing mode when the light blinking according to the configured period is detected from the preview image.

According to various embodiments, in operation 940, the processor may display an indicator related to the photographing mode of the electronic device 101.

According to various embodiments, when the photographing mode is the mirror selfie photographing mode, the processor may display an indicator indicating a face region of the object corresponding to the person included in the preview image together with the preview image. For example, the processor may display a circular indicator surrounding the face region of the object corresponding to the person.

According to various embodiments, when the photographing mode is the mirror selfie photographing mode, the processor may display an indicator indicating a body proportion of the object corresponding to the person included in the preview image. For example, when a ratio of a vertical length of the face region of the object corresponding to the person to the entire vertical length thereof is 1:6, the processor may determine that the body proportion of the object corresponding to the person is six heads.

According to various embodiments, when the photographing mode is the mirror selfie photographing mode, the processor may determine whether the body proportion of the object corresponding to the person included in the preview image corresponds to a configured body proportion, and may determine a color of the indicator indicating the body proportion based on a determination result. For example, when the body proportion of the object corresponding to the person included in the preview image corresponds to the configured body proportion, the processor may display, for example, the edge or the whole of the indicator indicating the body proportion in green. For example, when the body proportion of the object corresponding to the person included in the preview image does not correspond to the configured body proportion, the processor may display the edge or the whole of the indicator indicating the body proportion in red.

According to an embodiment, the processor may change the color of the indicator indicating the body proportion according to a difference between the body proportion of the object corresponding to the person included in the preview image and the configured body proportion. For example, in a case in which the configured body proportion is seven heads, the electronic device 101 may display the edge or the whole of the indicator indicating the body proportion in red when the body proportion of the object corresponding to the person included in the preview image is five heads, may display the same in yellow when the body proportion is six heads, may display the same in green when the body proportion is seven heads, may display the same in yellow when the body proportion is eight heads, or may display the same in red when the body proportion is nine heads.

According to an embodiment, when the photographing mode is the mirror selfie photographing mode, the processor may display an indicator dividing the body regions of the object corresponding to the person included in the preview image. For example, the processor may display an indicator for dividing the object corresponding to the person into partial regions (e.g., a face region, an upper body region excluding the face region, a leg region, a foot region, etc.). The processor may divide the object corresponding to the person into a plurality of regions based on a variety of information such as color, brightness, saturation, lengths of a straight line component and a curved line component of a boundary, or a bending angle of each partial region included in the object corresponding to the person in order to divide the object corresponding to the person into the plurality of regions.

According to an embodiment, the processor may display an indicator providing guide information so that the body proportion of the object corresponding to the person included in the preview image matches the configured body proportion. For example, when the body proportion of the object corresponding to the person included in the preview image is 6 heads and the configured body proportion is 5 heads, the processor may display an indicator providing guide information that can induce a user to change a photographing angle.

According to an embodiment, the processor may output the guide information that can induce a user to change a photographing angle through the audio module 170.

According to an embodiment, when the body proportion of the object corresponding to the person included in the preview image matches the configured body proportion, the processor may output a mechanical vibration through the haptic module 179.

According to an embodiment, the processor may emit light through the one or more light emitting diodes included in the flash 220 based on whether the body proportion of the object corresponding to the person included in the preview image matches the configured body proportion. For example, when the body proportion of the object corresponding to the person included in the preview image does not match the configured body proportion, the electronic device 101 may emit light through the one or more light emitting diodes included in the flash 220. For example, when the body proportion of the object corresponding to the person included in the preview image does not match the configured body proportion, the processor may blink light twice through the flash 220 during a configured period, and when the body proportion of the object corresponding to the person included in the preview image matches the configured body proportion, the processor may blink light once through the flash 220 during the configured period.

According to various embodiments, in operation 950, the processor may determine whether to photograph a subject through the camera module 180. For example, when a user selects a photographing function using a user interface displayed through the display device 160, the processor may determine photographing of the subject.

According to various embodiments, when the photographing of the subject is determined, in operation 960, the processor may acquire an image of the subject. The processor may store, for example, the acquired image in the memory 130.

According to various embodiments, in operation 970, the processor may process the acquired image. The processor may correct a partial region of an object corresponding to a person included in the acquired image based on, for example, information related to the configured body proportion. For example, when a configured ratio of a vertical length of the foot region to a vertical length of the leg region is 1:6 in a case in which the body proportion of the object corresponding to the person is 7 heads, and when a ratio of a vertical length of the foot region of the object corresponding to the person included in the acquired image in operation 950 to a vertical length of the leg region thereof is 1:4, the processor may correct the size of the foot region (e.g., at least one of the vertical length and the horizontal length) so that the ratio of the vertical length of the foot region of the object corresponding to the person included in the acquired image to the vertical length of the leg region thereof becomes 1:6. For example, when the configured body proportion is 7 heads and the body proportion of the object corresponding to the person included in the acquired image in operation 950 is 5 heads, the processor may correct the size of the face region so that the body proportion of the object corresponding to the person included in the acquired image becomes 7 heads. The processor may correct the size of the leg region so that the body proportion of the object corresponding to the person included in the acquired image becomes 7 heads.

An image processing method of the electronic device 101 according to various embodiments of the disclosure may include: acquiring a preview image through a camera module (e.g., the camera module 180 of FIG. 1) including a lens (e.g., the lens assembly 210 of FIG. 2) positioned on one surface of the electronic device 101; determining whether a human object corresponding to a person is included in the preview image; determining a photographing mode of the electronic device 101 at least based on the determination and a type and change in at least one object included in the preview image; and displaying at least one indicator related to the determined photographing mode through a display (e.g., the display device 160 of FIG. 1) positioned on the other surface of the electronic device 101.

In the image processing method of the electronic device 101 according to various embodiments of the disclosure, when the human object is included in the preview image, the determining of the photographing mode may include inverting the preview image vertically or horizontally; and determining the photographing mode at least based on whether text is included in the inverted preview image.

In the image processing method of the electronic device 101 according to various embodiments of the disclosure, the determining of the photographing mode may include: determining whether an object corresponding to the electronic device 101 is included in the preview image when the human object is included in the preview image; and determining the photographing mode at least based on a positional change in the remaining object except the object corresponding to the electronic device 101 included in the preview image with respect to a position of the object corresponding to the electronic device 101 when the object corresponding to the electronic device 101 is included in the preview image.

In the image processing method of the electronic device 101 according to various embodiments of the disclosure, the determining of the photographing mode may include: determining a specific region of the preview image in which the human object is located when the human object is included in the preview image; and determining the photographing mode at least based on a difference between a change in at least one objet included in the specific region and a change in at least one object included in the remaining region except the specific region.

In the image processing method of the electronic device 101 according to various embodiments of the disclosure, the determining of the photographing mode may include: determining whether the object corresponding to the electronic device 101 is included in the preview image when the human object is included in the preview image; detecting a physical movement of the electronic device 101 through a sensor module (e.g., the sensor module 176 of FIG. 1) of the electronic device 101 when the object corresponding to the electronic device 101 is included in the preview image; and determining the photographing mode based on a result obtained by comparing a positional change in the preview image of the object corresponding to the electronic device 101 with respect to the human object and the detected physical movement of the electronic device 101.

In the image processing method of the electronic device 101 according to various embodiments of the disclosure, the determining of the photographing mode may include: controlling at least one light emitting diode (e.g., the flash 220 of FIG. 2) included in the electronic device 101 to emit light according to a configured reference when the human object is included in the preview image; and determining the photographing mode at least based on whether an object corresponding to the light emitted according to the configured reference is included in the preview image.

In the image processing method of the electronic device 101 according to various embodiments of the disclosure, the displaying of the at least one indicator may include: identifying a face region of the human object included in the preview image; and displaying an indicator corresponding to the human object based on a size of the identified face region.

In the image processing method of the electronic device 101 according to various embodiments of the disclosure, the displaying of the at least one indicator may include: determining a ratio for the human object based on the size of the identified face region and a size of the human object; and displaying an indicator indicating the determined ratio for the human object.

In the image processing method of the electronic device 101 according to various embodiments of the disclosure, the displaying of the at least one indicator may include: changing a color of the indicator indicating the ratio for the human object according to a change in the ratio for the human object.

The image processing method of the electronic device 101 according to various embodiments of the disclosure may further include: acquiring an image through the camera module in response to a signal related to photographing; and adjusting a size of at least one image region related to the human object included in the image at least based on the determined ratio for the human object.

The embodiments of the disclosure disclosed in this specification and the drawings merely describe the technical contents of the embodiments according to the embodiments of the disclosure and provide specific examples to help understand the embodiments of the disclosure. It is not intended to limit the scope of the embodiments of the disclosure. Accordingly, the scope of various embodiments of the disclosure should be interpreted to include all changes or modified forms derived based on the technical spirit of the various embodiments of the disclosure in addition to the embodiments disclosed herein to be included in the scope of various embodiments of the disclosure.

The invention claimed is:

1. An electronic device comprising:
a camera module configured to include a lens positioned on one surface of the electronic device;
a display configured to be positioned on an other surface of the electronic device; and
a processor configured to be electrically connected to the camera module and the display,
wherein the processor is configured to:
acquire a preview image through the camera module,
determine whether a human object corresponding to a person is included in the preview image,
determine a photographing mode of the electronic device at least based on the determination and a type and change of at least one object included in the preview image,
display at least one indicator related to the determined photographing mode through the display, and
change a color of the at least one indicator indicating a ratio for the human object according to a change in the ratio for the human object.

2. The electronic device of claim 1, wherein the processor is further configured to:
invert the preview image vertically or horizontally when the human object is included in the preview image, and
determine the photographing mode at least based on whether text is included in the inverted preview image.

3. The electronic device of claim 1, wherein the processor is further configured to:
determine whether an object corresponding to the electronic device is included in the preview image when the human object is included in the preview image, and
determine the photographing mode at least based on a positional change of a remaining object except the object corresponding to the electronic device included in the preview image with respect to a position of the object corresponding to the electronic device when the object corresponding to the electronic device is included in the preview image.

4. The electronic device of claim 1, wherein the processor is further configured to:
determine a specific region of the preview image in which the human object is located when the human object is included in the preview image, and
determine the photographing mode at least based on a difference between a change in the at least one object included in the specific region and a change in the at least one object included in a remaining region except the specific region.

5. The electronic device of claim 1, further comprising:
a sensor module,
wherein the processor is further configured to:
determine whether the at least one object corresponding to the electronic device is included in the preview image when the human object is included in the preview image,
detect a physical movement of the electronic device through the sensor module when the at least one object corresponding to the electronic device is included in the preview image, and
determine the photographing mode based on a result obtained by comparing a positional change in the preview image of the at least one object corresponding to the electronic device with respect to the human object with the detected physical movement of the electronic device.

6. The electronic device of claim 1, further comprising:
at least one light emitting diode configured to be positioned on the one surface,
wherein the processor is further configured to:
control the at least one light emitting diode to emit light according to a configured reference when the human object is included in the preview image, and determine the photographing mode at least based on whether an object corresponding to the light emitted according to the configured reference is included in the preview image.

7. The electronic device of claim 1, wherein the processor is further configured to:
identify a face region of the human object included in the preview image, and
display the at least one indicator corresponding to the human object through the display based on a size of the identified face region.

8. The electronic device of claim 7, wherein the processor is further configured to:
determine the ratio for the human object based on the size of the identified face region and a size of the human object, and
display the at least one indicator indicating the determined ratio for the human object through the display.

9. The electronic device of claim 8, wherein the processor is further configured to:
acquire an image through the camera module in response to a signal related to the photographing mode, and
adjust a size of at least one region related to the human object included in the image at least based on the determined ratio for the human object.

10. An image processing method of an electronic device, comprising:
acquiring a preview image through a camera module including a lens positioned on one surface of the electronic device;
determining whether a human object corresponding to a person is included in the preview image;
determining a photographing mode of the electronic device at least based on the determination and a type and change of at least one object included in the preview image;
displaying at least one indicator related to the determined photographing mode through a display positioned on an other surface of the electronic device; and
changing a color of the at least one indicator indicating a ratio for the human object according to a change in the ratio for the human object.

11. The image processing method of claim 10, wherein the determining of the photographing mode comprises:
inverting the preview image vertically or horizontally when the human object is included in the preview image; and
determining the photographing mode at least based on whether text is included in the inverted preview image.

12. The image processing method of claim 10, wherein determining of the photographing mode comprises:
determining whether an object corresponding to the electronic device is included in the preview image when the human object is included in the preview image; and
determining the photographing mode at least based on a positional change of a remaining object except the object corresponding to the electronic device included in the preview image with respect to a position of the object corresponding to the electronic device, when the object corresponding to the electronic device is included in the preview image.

13. The image processing method of claim 10, wherein determining of the photographing mode comprises:
determining a specific region of the preview image in which the human object is located when the human object is included in the preview image; and
determining the photographing mode at least based on a difference between a change in the at least one object included in the specific region and a change in the at least one object included in a remaining region except the specific region.

14. The image processing method of claim 10, wherein determining of the photographing mode comprises:
determining whether the at least one object corresponding to the electronic device is included in the preview image when the human object is included in the preview image;
detecting a physical movement of the electronic device through a sensor module of the electronic device when the at least one object corresponding to the electronic device is included in the preview image; and
determining the photographing mode based on a result obtained by comparing a positional change in the preview image of the at least one object corresponding to the electronic device with respect to the human object with the detected physical movement of the electronic device.

* * * * *